F. M. MASKER.
FRUIT JAR TONGS.
APPLICATION FILED JULY 23, 1917.
1,343,518.
Patented June 15, 1920.
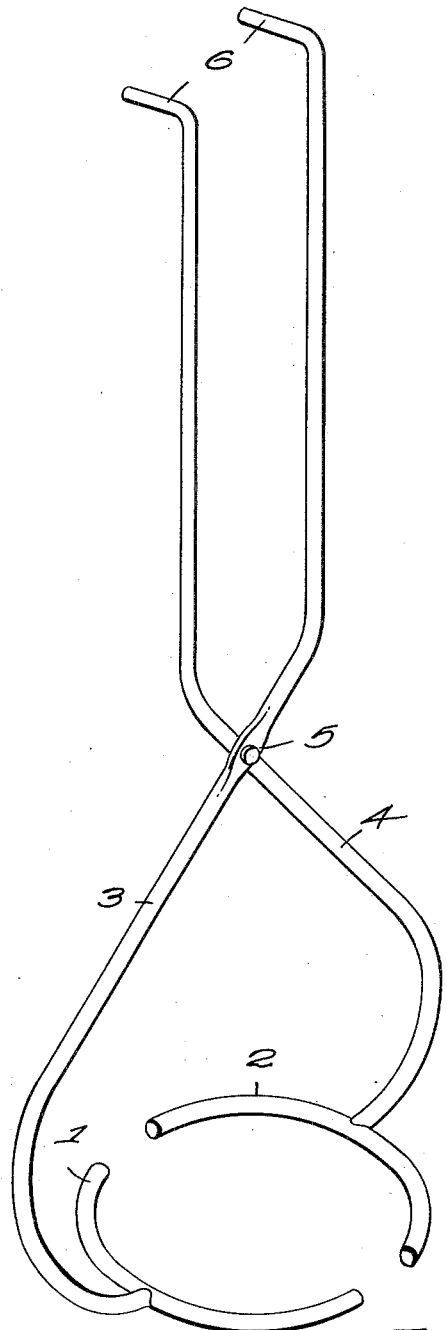
Frederick M. Masker
Inventor
By Geo. P. Kimmel
Attorney

UNITED STATES PATENT OFFICE.

FREDERICK M. MASKER, OF PLAINFIELD, NEW JERSEY.

FRUIT-JAR TONGS.

1,343,518.

Specification of Letters Patent.   Patented June 15, 1920.

Application filed July 23, 1917. Serial No. 182,218.

*To all whom it may concern:*

Be it known that I, FREDERICK M. MASKER, a citizen of the United States, and resident of Plainfield, in the county of Union and State of New Jersey, have invented certain new and useful Improvements in Fruit-Jar Tongs, of which the following is a specification.

This invention relates to culinary articles and it is the primary object of the invention to provide improved jar lifting tongs whereby hot fruit jars or the like, in the process of canning or sterilizing either by steam or boiling can be lifted without danger of burning or scalding the hands of the user.

Among other aims and objects of the invention may be recited, the provision of a tool of the character mentioned with a view to compactness, and in which the number of parts are few, the construction simple, the cost of production small, and efficiency and operation high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings there is shown a perspective view of my improved jar lifting tongs.

Having more particular reference to the drawings and in connection with which like reference characters will refer to corresponding parts, the numerals 1 and 2 represent the oppositely disposed jaws of the improved tongs, the same being substantially semi-circular in shape in order that they may snugly receive the tops of fruit jars or like receptacles therebetween. Handle portions 3 and 4 extend upwardly from the semi-circular jaws 1 and 2, and are crossed and pivotally connected as at 5 whereupon they extend further upwardly and have their upper extremities directed laterally as at 6 and in parallel relation. By offsetting the extremities of the cross handles 3 and 4, it will be readily understood that the tongs may be easily grasped in the hands of a user and the normally spaced handles forced toward each other to cause the semi-circular jaws 1 and 2 to grip the top of a fruit jar. Further, by reason of the offsetting of the extremities of the crossed handles, the tongs may be efficiently gripped in the hands of a user and jars of considerable weight continuously lifted therewith.

From the foregoing it will be understood that with my improved jar lifting tongs, fruit jars or like receptacles may be easily and safely lifted from receptacles during the process of canning, either by steam or boiling without liability of injuring or scalding the hands or other portions of the user's body. It will also be understood, that due to the semi-circular shape of the jaws 1 and 2, the tongs will securely engage the tops of fruit jars, thus, preventing accidental disengaging of the same. In an instance where a jar is inaccessible to the jaws 1 and 2, owing to its position in the liquid containing receptacle or to its obstruction by other jars, the mouth edge of the jar is engaged between the laterally directed handle terminals 6 and the latter moved into clamping relation thereto by drawing the jaws 1 and 2 together. It is evident that the shape of the jaws is such as to permit them to be conveniently grasped in the hand and utilized for this purpose.

Manifestly, the construction shown is capable of considerable modification and such modification as is within the scope of my claim, I consider within the spirit of my invention.

I claim:

A jar lifter of the character described comprising a pair of levers disposed in crossed relation to each other intermediate their ends, a transverse pivot connecting the levers at the crossing point thereof, the levers at one side of the pivot being straight and formed with end portions bent at right angles thereto, the remaining portions of the levers being reversely bent at an angle to the straight portion and inwardly curved for a distance thereof, and opposed semi-circular shaped jaws connected intermediate thereof to the extremities of the curvatures of said levers.

In testimony whereof, I affix my signature hereto.

FREDERICK M. MASKER.